(12) United States Patent
Markaj

(10) Patent No.: US 7,861,329 B2
(45) Date of Patent: Jan. 4, 2011

(54) DISPOSABLE DRAIN FILTER

(76) Inventor: Viktor Markaj, 5925 N. Drake, Chicago, IL (US) 60659

( * ) Notice: Subject to any disclaimer, the term of this patent is extended or adjusted under 35 U.S.C. 154(b) by 0 days.

(21) Appl. No.: 12/661,486

(22) Filed: Mar. 18, 2010

(65) Prior Publication Data
US 2010/0236645 A1 Sep. 23, 2010

Related U.S. Application Data

(62) Division of application No. 11/714,632, filed on Mar. 6, 2007, now Pat. No. 7,725,960.

(51) Int. Cl.
*E03C 1/26* (2006.01)
(52) U.S. Cl. .................. 4/289; 4/256.1; 4/290
(58) Field of Classification Search .............. 4/256.1, 4/286–292, 295, 652
See application file for complete search history.

(56) References Cited

U.S. PATENT DOCUMENTS

| | | | | |
|---|---|---|---|---|
| 1,217,763 A | * | 2/1917 | Hirrich | 4/DIG. 14 |
| 1,640,198 A | * | 8/1927 | Lobit | 210/454 |
| 1,935,128 A | * | 11/1933 | Pullman | 4/286 |
| 2,690,569 A | * | 10/1954 | Kozerski | 4/292 |
| 2,727,267 A | * | 12/1955 | Osgood | 15/182 |
| 3,959,831 A | * | 6/1976 | Hendricks | 4/287 |
| 4,199,827 A | * | 4/1980 | Tuleja | 4/289 |
| 4,999,858 A | * | 3/1991 | Wu | 4/288 |
| 5,003,642 A | * | 4/1991 | Robb et al. | 4/287 |
| 5,546,614 A | * | 8/1996 | King, II | 4/256.1 |
| 5,903,946 A | * | 5/1999 | Collins et al. | 15/104.061 |
| 6,088,843 A | * | 7/2000 | Francisco | 4/289 |
| 6,868,575 B2 | * | 3/2005 | Koregelos | 15/104.04 |

* cited by examiner

*Primary Examiner*—Khoa D Huynh

(57) ABSTRACT

The present invention provides a disposable drain filter comprising a central shaft having a first end region and second end region, and a plurality of snaring discs having a central opening to accommodate the shaft. The snaring discs having radially emanating fins that form a fin snaring disc, wherein each fin is defined by a flat upper wall and a pair of side wall surfaces that meet at a single point, the flat upper wall having a plurality of upwardly projecting protrusions placed at the junction of the upper wall and side walls, to further grip materials. The fin has a narrow first end region affixed to the hollow tube, and a wide second end region. The second end regions of adjacent fins are separated by a 0.25 inch gap. A barb snaring disc is placed sequentially after each fin snaring disc, thereby forming an alternating sequence of snaring discs, wherein the barb snaring discs have radially emanating bristle extensions with barbs to further grip materials. The filter is dimensioned to take a resting position above the trap region of a shower drain. The filter can also be applied to a kitchen and lavatory drain.

1 Claim, 3 Drawing Sheets

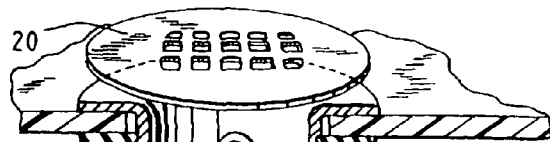
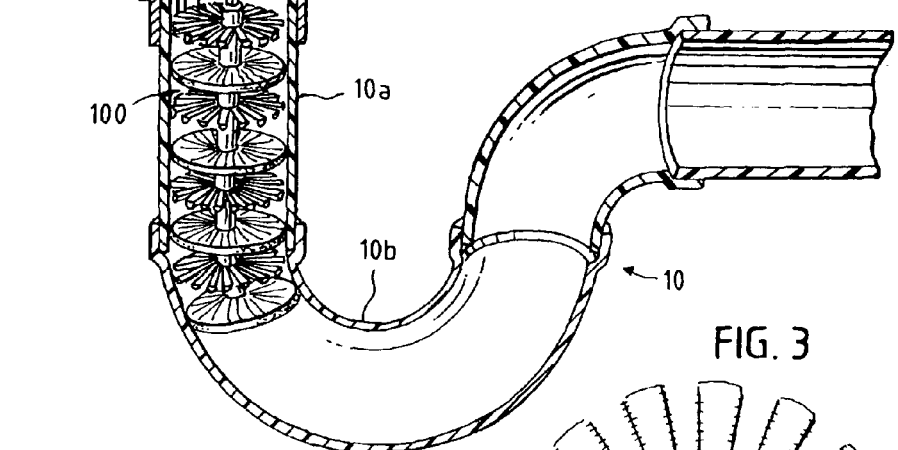
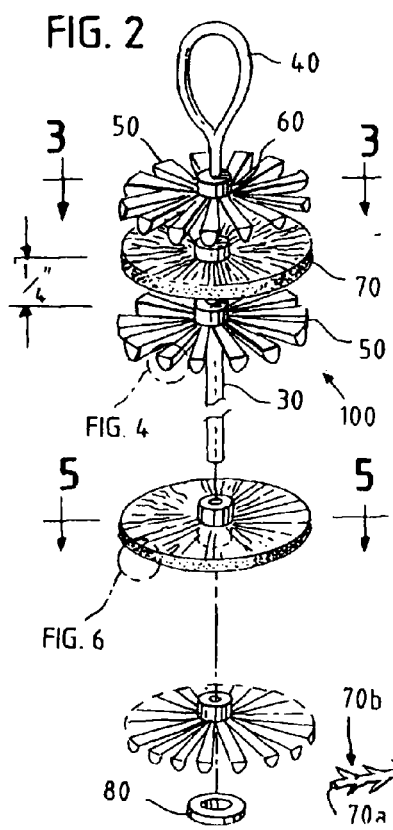
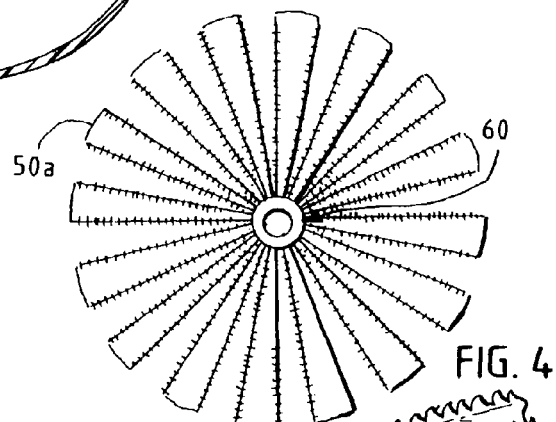
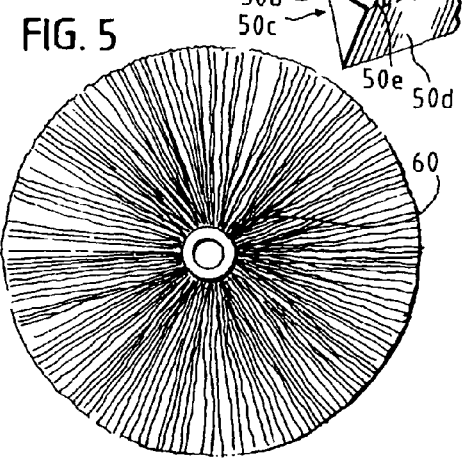
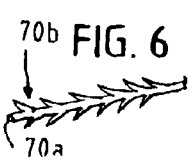

DISPOSABLE DRAIN FILTER

CROSS REFERENCE TO RELATED APPLICATIONS

This is a division of application Ser. No. 11/714,632 filed Mar. 6, 2007 now U.S. Pat. No. 7,725,960.

FIELD OF THE INVENTION

The present invention relates to a drain filters, and more particularly disposable filters for shower, kitchen, and lavatory drains.

BACKGROUND OF THE INVENTION

Accumulation of solid and fibrous debris in drain pipes can cause backup of unsightly and unhygienic fluids in showers, kitchen sinks and lavatories. Clogged residential and commercial pipes are often cleared with abrasive chemical solutions which may harm individuals and the environment. The prior art discloses numerous systems employing traps, filters and strainers for preventing materials from clogging drain pipes.

U.S. Pat. No. 6,088,843 discloses a drain strainer for installation into the vertical drain pipe of a bathing water drain for a shower or tub. The drain strainer includes a sieve receptacle having a substantially cylindrical basket, a bristle extension with a stem having a plurality of bristles, a support structure to suspend the sieve receptacle and bristle extension within the drain pipe.

U.S. Pat. No. 6,487,729 B2 discloses a hair and fibrous shower trap that comprises a material trapping system loop structure. The loop structure is comprised of multiple, concentric circles fixedly attached to each other. The loop structure has a large opening at one end and a smaller opening at the other. The loop structure is dimensioned to fit pop-up, plunger, or push-pull drains for showers, bathtubs, or sinks. In one embodiment, the loop structure is called a salon trap which is shaped in such a manner as to fit within the screw-on opening to a sink trap.

U.S. Pat. No. 4,490,862 discloses a drain filter for preventing hair and debris from entering a drain of a bathtub, shower stall, lavatory, sink and the like having a liftable stopper and a flange. The filter has a body shaped and dimension to be adapted to extend entirely around the lifted stopper periphery and extends around the external periphery of the drain. The body is fabricated of a filamentary material with openings to allow for the free passage of water down into the drain, and has a plurality of outward projections above the opening to entangle hair and debris.

These approaches do not present an optimal system for trapping and removing hair from a drain pipe. Solutions which employ a basket-like structure to trap fibrous materials may be circumvented if the basket becomes clogged with small debris. Debris that accumulates in the lowest point of the basket may impede flow down the drain and inhibit the trapping action of the basket. Furthermore, unpleasant odors may be emitted from the drain pipe if debris, such as hair, is trapped in the low point of basket placed at an insufficient depth in the drain pipe. Solutions that place a filter in only the trap region of a drain will likely result in blockage and ineffective capture of fibrous materials since the trapping action takes place at the lowest point instead of the vertical drain pipe. Furthermore, removal of such a filter may be cumbersome since the filter would have to be removed from the bottom of the trap region. Solutions that employ a one system approach do not provide redundancy in the event that the capturing mechanism is compromised. Solutions that require modifications to be made such as altering the pop-up stopper can be both costly, difficult and unsanitary to remove.

In light of the shortcomings in the prior art, a system for trapping is desired that employs an ensnaring systems that has a multiple backup ensnaring mechanisms in the event that the primary ensnaring mechanism is circumvented. The ideal system will be easy to remove from a drain pipe, disposable, and extend from the vertical drain pipe up to or beyond the trap, thereby providing a large surface area for ensnaring materials.

SUMMARY OF THE INVENTION

The present invention provides a disposable drain filter comprising a central shaft having a first end region and second end region; a plurality of snaring discs having a central opening to accommodate the shaft, the central opening being defined by a hollow tube; the snaring discs having radially emanating fins that form a fin snaring disc, wherein each fin is defined by a flat upper wall and a pair of side wall surfaces that meet at a single point, the flat upper wall having a plurality of upwardly projecting protrusions placed at the junction of the upper wall and side walls, to further grip materials; the fin having a narrow first end region affixed to the hollow tube, and a wide second end region, the second end regions of adjacent fins being separated by a 0.25 inch gap; a barb snaring disc placed sequentially after each fin snaring disc, thereby forming an alternating sequence of snaring discs, wherein the barb snaring discs have radially emanating bristle extensions with barbs to further grip materials; the distal ends of the hollow tube dimensioned to form a minimum vertical separation of at least 0.25 inches between fins snaring discs and barb snaring discs; the snaring discs dimensioned to make minimal contact with the drain pipe, thereby preventing the filter from moving down the vertical drain pipe after insertion; the filter dimensioned to take a resting position above the trap region of a shower drain; the shaft is flexible; and the first end region affixed to a looped handle for insertion and removal of the filter from the drain and the second end region affixed to a washer to prevent the discs from exiting the shaft.

In one embodiment, the present invention provides a disposable drain filter comprising a plurality of snaring discs spiraling downward along the height of a central shaft to form a helix, the snaring discs defined by radially emanating bristle extensions; a railing and a first and second support arm, wherein the railing spirals around the snaring discs and stabilizes the helix, wherein bristle extensions extend through the railing and are dimensioned to form a 0.125 inch gap between the snaring discs and the drain pipe, the support arms connecting the railing to the shaft, thereby stabilizing the railing; the second end region having a handle to permit removal of the filter from either end region; the filter extending from the vertical drain pipe of a kitchen sink through the trap region. In another embodiment, the disposable filter extends from the vertical drain pipe of a lavatory through the trap region.

BRIEF DESCRIPTION OF THE DRAWINGS

The features of this invention will be understood more fully and clearly apparent from the following description made in connection with the accompanying drawings wherein like reference numbers and characters refer to similar parts throughout the several views, and in which:

FIG. 1 is a side elevational view of the disposable drain filter placed in a cross section of the drain pipe.

FIG. 2 is a exploded view of the disposable drain filter.

FIG. 3 is a top view of the fin snaring disc.

FIG. 4 is a partial perspective view of a fin.

FIG. 5 is a top view of the barb snaring disc.

FIG. 6 is a perspective view of a bristle extension.

DETAILED DESCRIPTION OF THE INVENTION

Figure 7:
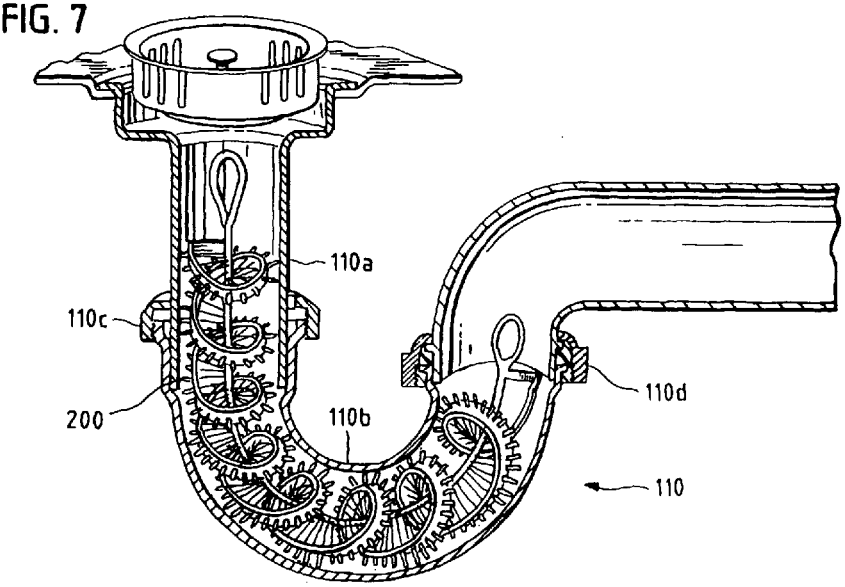
FIG. 7 is a side elevational view of the disposable drain filter placed in a cross section of the drain pipe and extending through the trap region.

Turning now to the drawings, and particularly to FIG. 1, what is shown is a first embodiment of a disposable filter 100 placed in a vertical drain pipe 10a of a shower drain 10. The filter 100 is hidden from view due to its location below the shower drain cover 20. The filter 100 is dimensioned to remain above the trap 10b.

A central shaft 30 with a first and a second end region is fabricated of a flexible material such as rubber or plastic which permits the shaft to bend to allow insertion and removal of the filter, as shown in FIG. 2. The shaft 30 also has a sufficient tensile strength to prevent bending to the degree that would permit the filter 100 to slide down into the trap 10b from its original place of insertion. In its preferred embodiment, the shaft 30 has a diameter of 0.186 inches. A looped handle 40 is affixed to the first end region of the central shaft 30 to permit insertion of the filter.

The filter 100 is comprised of a plurality of fin snaring discs 50 and barb snaring discs 70, as shown in FIG. 2. The discs have a central opening defined by a hollow tube 60 that is fabricated of plastic or a suitable material known in the art, as shown in FIGS. 3 and 5. The hollow tubes 60 have a diameter of 0.50 inches. The distal ends of the hollow tube 60 range from 0.125 to 0.25 inches. The fin snaring disc 50 is comprised of a plurality of fins 50a which radially emanate from the hollow tube 60, as shown in FIG. 3. The fin 50a is fabricated of a foam-like material or plastic. The fin 50a has a narrow first end region affixed to the midpoint of the height of the hollow tube 60 and a wide second end region. The length is preferably 0.75 inches to permit the second end region to make Turning now to the drawings, and particularly to FIG. 1, what is shown is a first embodiment of a disposable filter 100 placed in a vertical drain pipe 10a of a shower drain 10. The filter 100 is hidden from view due to its location below the shower drain cover 20. The filter 100 is dimensioned to remain above the trap 10b.

A central shaft 30 with a first and a second end region is fabricated of a flexible material such as rubber or plastic which permits the shaft to bend to allow insertion and removal of the filter, as shown in FIG. 2. The shaft 30 also has a sufficient tensile strength to prevent bending to the degree that would permit the filter 100 to slide down into the trap 10b from its original place of insertion. In its preferred embodiment, the shaft 30 has a diameter of 0.186 inches. A looped handle 40 is affixed to the first end region of the central shaft 30 to permit insertion of the filter.

The filter 100 is comprised of a plurality of fin snaring discs 50 and barb snaring discs 70, as shown in FIG. 2. The discs have a central opening defined by a hollow tube 60 that is fabricated of plastic or a suitable material known in the art, as shown in FIGS. 3 and 5. The hollow tubes 60 have a diameter of 0.50 inches. The distal ends of the hollow tube 60 range from 0.125 to 0.25 inches. The fin snaring disc 50 is comprised of a plurality of fins 50a which radially emanate from the hollow tube 60, as shown in FIG. 3. The fin 50a is fabricated of a foam-like material or plastic. The fin 50a has a narrow first end region affixed to the midpoint of the height of the hollow tube 60 and a wide second end region. The length is preferably 0.75 inches to permit the second end region to make sufficient contact with the inner drain wall to stabilize the filter 100 in its originally inserted position. The fins 50a are radially positioned along the hollow tube 60 to form a 0.25 inch gap between the second end regions of adjacent fins 50a. The fins are attached to the hollow tube during formation of the hollow tube by a means generally known in the art. The hollow tube 60 has a sufficient thickness to permit attachment of the fins 50. In another embodiment, the fins 50 and hollow tube 60 are formed from a common mold. The fin 50a is defined by an upper wall 50b and a pair of side walls (50c and 50d). The upper wall 50b has a plurality of upward extending protrusions 50e to grip materials flowing down the drain as shown in FIG. 4. The side walls (50c and 50d) taper down to meet at single point, thereby forming a wedge.

A barb snaring disc 70 is shown in FIG. 5. The barb snaring disc 70 is comprised of bristle extensions 70a which radially emanate from the hollow tube 60. The bristle extensions 70a have a multitude of barbs 70b, as shown in FIG. 6. In a preferred embodiment, the bristle extensions 70a and barbs 70b are fabricated from plastic, nylon or a suitable material generally known in the art. The bristle extensions 70a have a length that permits the barb snaring disc 70 to make a minimal contact with the inner drain walls to stabilize the filter 100 in its originally inserted position in the vertical drain pipe 10a.

The fin snaring discs 50 and barb snaring discs 70 are arranged in an alternating manner along the shaft 30 with a first fin snaring disc 50 preceding the first barb snaring disc 70, as shown in FIG. 2. The distal ends of the hollow tube ensure a minimum vertical separation of 0.25 inches between the second end region of the fins and the end regions of the bristle extensions. The second end region of the shaft 30 is inserted through the hollow tubes 60, wherein a washer 80 secures the discs in place. The washer 80 is heat sealed to the shaft 30, or bonded by adhesive. The alternating arrangement of snaring discs provides redundancy in the event the unique ensnaring action of the preceding disc is circumvented by flowing materials. In a preferred embodiment, the filter 100 will have the maximum number of snaring discs permitted by the height of the shaft 30.

The fin snaring disc 50 has two mechanisms for ensnaring materials. The protrusions 50c are the first means to ensnare materials. Ensnared materials hang down the drain by their point of contact with the protrusions 50c. In addition, materials may be ensnared across the upper wall 50b of the fin 50a and held in place by the concerted action of a multiplicity of protrusions 50c. The 0.25 inch gap between the second end regions of the fins 50 adequate flow down the drain 10. Materials that flow between the gap or circumvent the protrusions must traverse through the bristle extensions 70a and barbs 70b of the barb snaring disc 70.

The alternating sequence of fin snaring discs 50 and barb snaring discs 70 provides a redundant ensnaring action that ensures that materials which circumvent the unique ensnaring mechanism of upstream discs must traverse through downstream discs before reaching the trap 10b, where materials may otherwise settle, accumulate and cause clogging.

Figure 8:
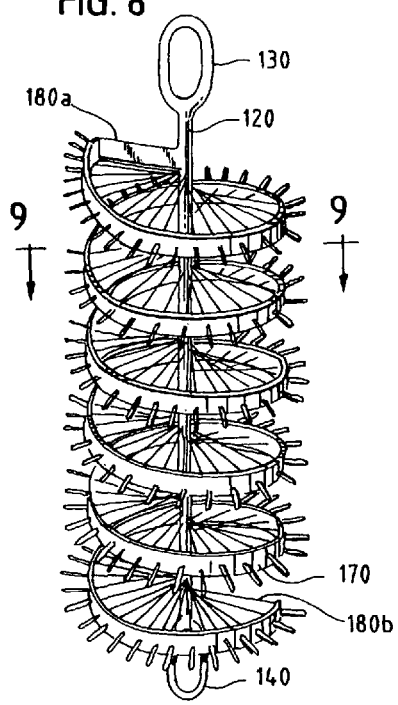
FIG. 8 is a top side view of the disposable drain filter.
Figure 9:
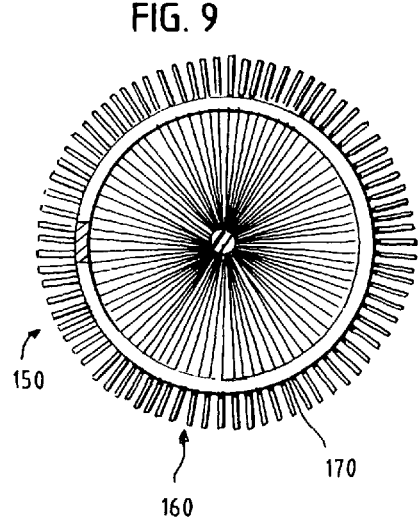
FIG. 9 is a top view of the spiraling snaring disc.

In another embodiment, the filter 200 is dimensioned to be employed in a kitchen sink drain pipe 110 and in particular, reside in the vertical drain pipe 110a and trap 110b, shown in FIG. 7. The filer 200 is inserted and removed by opening the trap 110b at both nuts (110c and 110d) or by through the drain opening. The central shaft 120 has a first end region and a second end region, wherein two looped handles (130 and 140) and affixed to the first end region and second end region, respectively, to permit insertion and removal of the filter 200 from either end region, as shown in FIGS. 7 and 8. A plurality of snaring discs 150 spiral down the height of the shaft 120 to form a helix. The snaring discs 150 are comprised of radially emanating bristle extensions 160 that are movably affixed to the central shaft 120. The snaring discs 150 are defined by extensions 160 emanating radially along the height of the central shaft. Each extension is spaced to form a gap along a latitudinal axis and longitudinal axis of the shaft to form the continuous helix along the height of the central shaft from the first end region to the second end region as shown in FIG. 8. The gap between each extension is uniform. The bristle extensions 160 are preferably fabricated from plastic, nylon or a suitable material generally known in the art.

Figure 10:
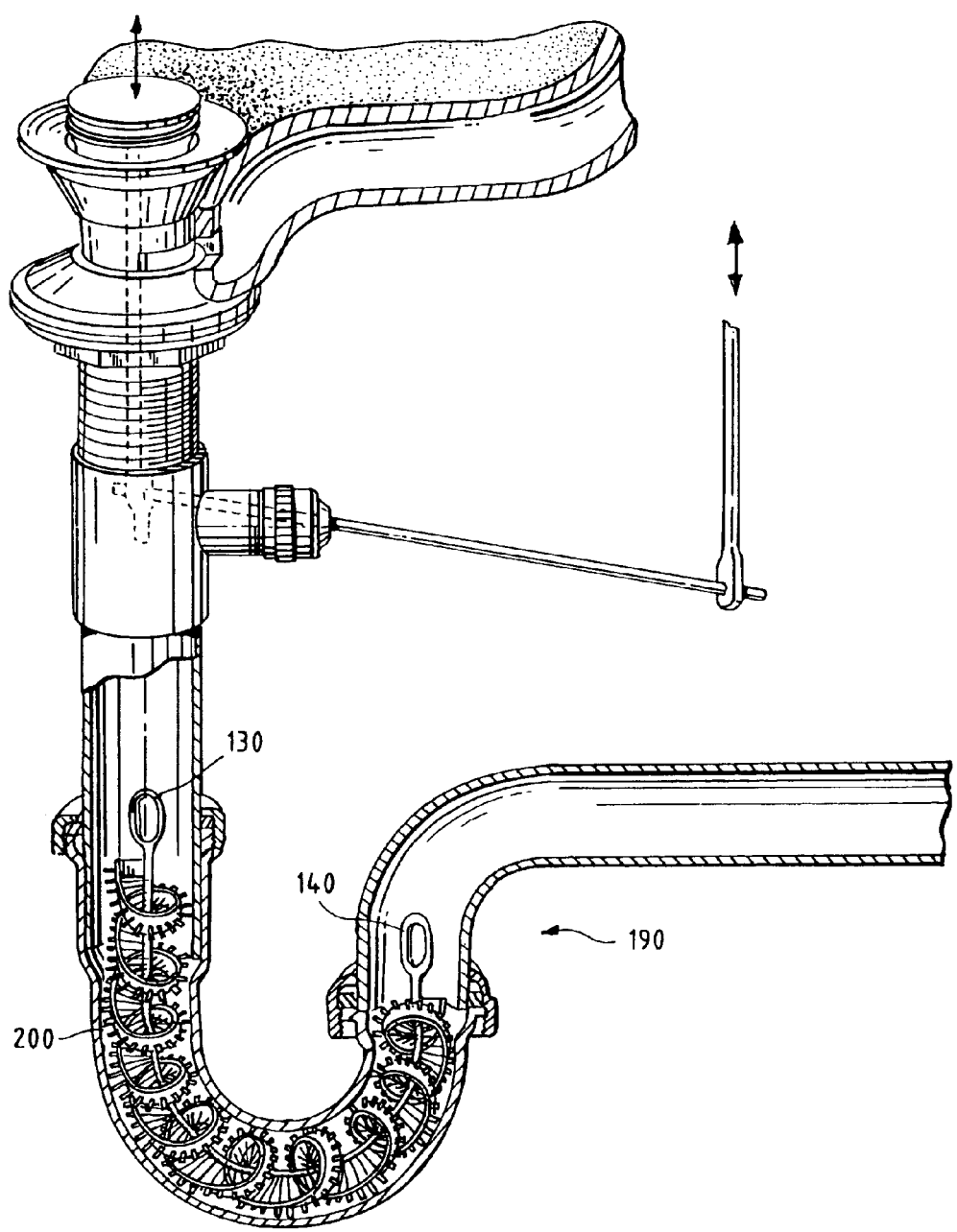
FIG. 10 is a side elevational view of the disposable drain filter placed in a cross section of a lavatory drain pipe and extending through the trap region.

A railing 170 spirals around the snaring discs 150 and stabilizes the helix, as shown in FIGS. 7 and 8. The railing 170 is preferably fabricated of malleable plastic. The bristle extensions 160 protrude through the railing 170 and are dimensioned to form a 0.125 inch separation between the snaring discs 150 and the inner drain wall. Two support arms (180a and 180b) perpendicularly extend from the distal ends of the railing 170 and are affixed to the shaft 120 by heat sealing or adhesives. The support arms 180 are preferably fabricated from the same mold as the railing 170. The support arms 180 may also be affixed to the railing 170. The filter 200 is preferably dimensioned to be employed in a kitchen drain pipe with a diameter of 1.5 inches. The bristle extensions 160 extend no more than 0.531 inches from the shaft 120. A 0.125 inch clearance exists between the bristle extensions 160 and the kitchen drain pipe 110. In yet another embodiment, the filter 200 is employed in a lavatory drain pipe 190 as shown in FIG. 10.

While in the foregoing specification a detailed description of an embodiment of the invention has been set down for the purpose of illustration, it is to be understood that the embodiment herein shown. Accordingly, many variations of the details herein given may be made by those skilled in the art without departing from the spirit and scope of the invention.

What is claimed is:

1. A disposable drain filter comprising:
   a central shaft having a height, a first end region, a second end region and two looped handles formed at the first end region and the second end region, respectively; wherein said looped handles permit insertion and removal of the disposable drain filter from a vertical drain pipe of a kitchen sink or a lavatory from either end regions;
   a plurality of snaring discs defined by extensions emanating radially along the height of the central shaft, wherein each extension is spaced to form a gap along a latitudinal axis and longitudinal axis of the shaft to form a continuous helix along the height of the central shaft from the first end region to the second end region, wherein the gap between each extension is uniform;
   a railing, wherein the railing spirals around the plurality of snaring discs and stabilizes the helix, wherein extensions protrude through the railing and are dimensioned to form a gap between the snaring discs and an inner surface of the vertical drain pipe;
   two support arms extend generally perpendicularly from distal ends of the railing, the support arms connecting the railing to the first and second end regions of the shaft thereby stabilizing the railing; and wherein the railing is made of a flexible material to enable insertion from the vertical drain pipe of the kitchen sink or a lavatory through a trap region.

* * * * *